United States Patent
Toso et al.

(10) Patent No.: US 9,208,413 B2
(45) Date of Patent: Dec. 8, 2015

(54) COLOR CORRECTING SYSTEM AND IMAGE FORMING APPARATUS INCLUDING SAME

(71) Applicant: Konica Minolta, Inc., Chiyoda-ku (JP)

(72) Inventors: Yoshiyuki Toso, Toyokawa (JP); Tadayasu Sekioka, Toyohashi (JP); Naotoshi Kawai, Toyokawa (JP); So Yano, Ibaraki (JP); Noboru Oomoto, Toyokawa (JP); Takashi Fujiwara, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/950,833

(22) Filed: Jul. 25, 2013

(65) Prior Publication Data

US 2014/0043627 A1 Feb. 13, 2014

(30) Foreign Application Priority Data

Aug. 9, 2012 (JP) ................................. 2012-176854

(51) Int. Cl.
| G06F 15/00 | (2006.01) |
| G06K 15/02 | (2006.01) |
| H04N 1/46 | (2006.01) |
| G06F 3/12 | (2006.01) |

(52) U.S. Cl.
CPC .............. G06K 15/1878 (2013.01); H04N 1/46 (2013.01); *G06F 3/1208* (2013.01); *G06F 3/1244* (2013.01)

(58) Field of Classification Search
None
See application file for complete search history.

(56) References Cited

U.S. PATENT DOCUMENTS

| 6,259,824 B1 | 7/2001 | Sekiya |
| 2006/0077407 A1* | 4/2006 | Tanaka ........................... 358/1.9 |
| 2006/0153603 A1* | 7/2006 | Nishikawa et al. ........... 399/301 |
| 2009/0034998 A1 | 2/2009 | Omata |
| 2012/0154832 A1* | 6/2012 | Yokoyama et al. ............ 358/1.9 |
| 2012/0206744 A1* | 8/2012 | Kobayashi ..................... 358/1.9 |

(Continued)

FOREIGN PATENT DOCUMENTS

| JP | 05-080626 A | 4/1993 |
| JP | 2007-127951 A | 5/2007 |

(Continued)

OTHER PUBLICATIONS

Office Action (Notification of Reasons for Refusal) dated Dec. 2, 2014, issued by the Japanese Patent Office in the corresponding Japanese Patent Application No. 2012-176854, and an English translation thereof. (15 pages).

*Primary Examiner* — Helen Q Zong
(74) *Attorney, Agent, or Firm* — Buchanan Ingersoll & Rooney PC

(57) ABSTRACT

A color correcting system mountable in an image forming apparatus comprises an imaging unit configured to perform image formation and a control unit configured to acquire a control parameter for use in image formation by the imaging unit and a status parameter indicating a status at the time of image formation. If a value for a color in an image formed by the imaging unit does not exceed a first threshold, and at least one member selected from the group consisting of adhering toner amount, gloss, line width, and line position for the image formed by the imaging unit does not exceed a second threshold, the control unit is configured to determine a control parameter on the basis of the acquired control parameter and the acquired status parameter, such that at least a color difference decreases.

9 Claims, 14 Drawing Sheets

(56) References Cited

U.S. PATENT DOCUMENTS

2012/0294635 A1* 11/2012 Yano .............................. 399/39
2013/0016169 A1* 1/2013 Ohtoshi et al. ................ 347/116

FOREIGN PATENT DOCUMENTS

| | | |
|---|---|---|
| JP | 2009-058941 A | 3/2009 |
| JP | 2009-217086 A | 9/2009 |

* cited by examiner

FIG. 1
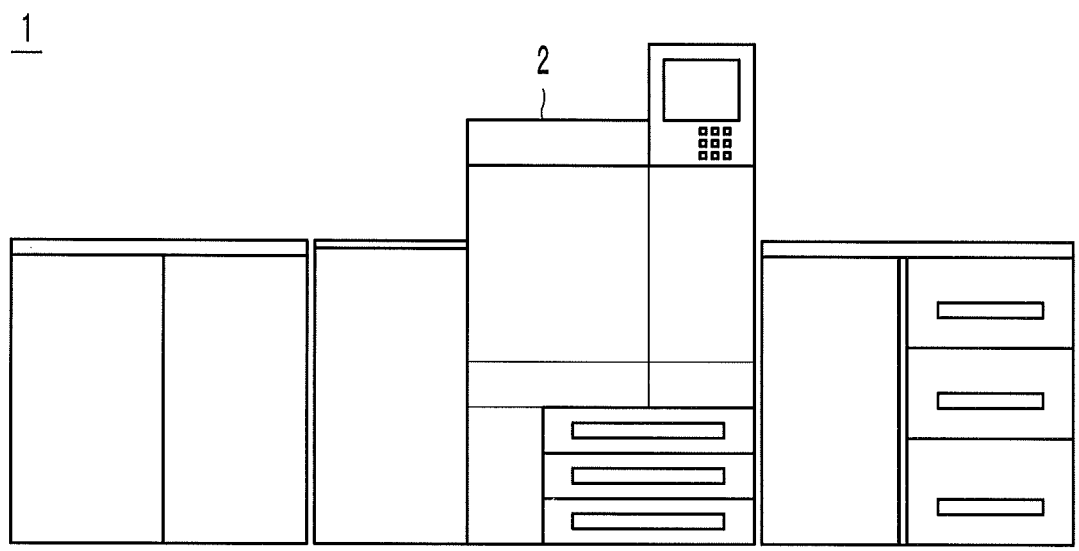
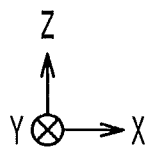

FIG. 2
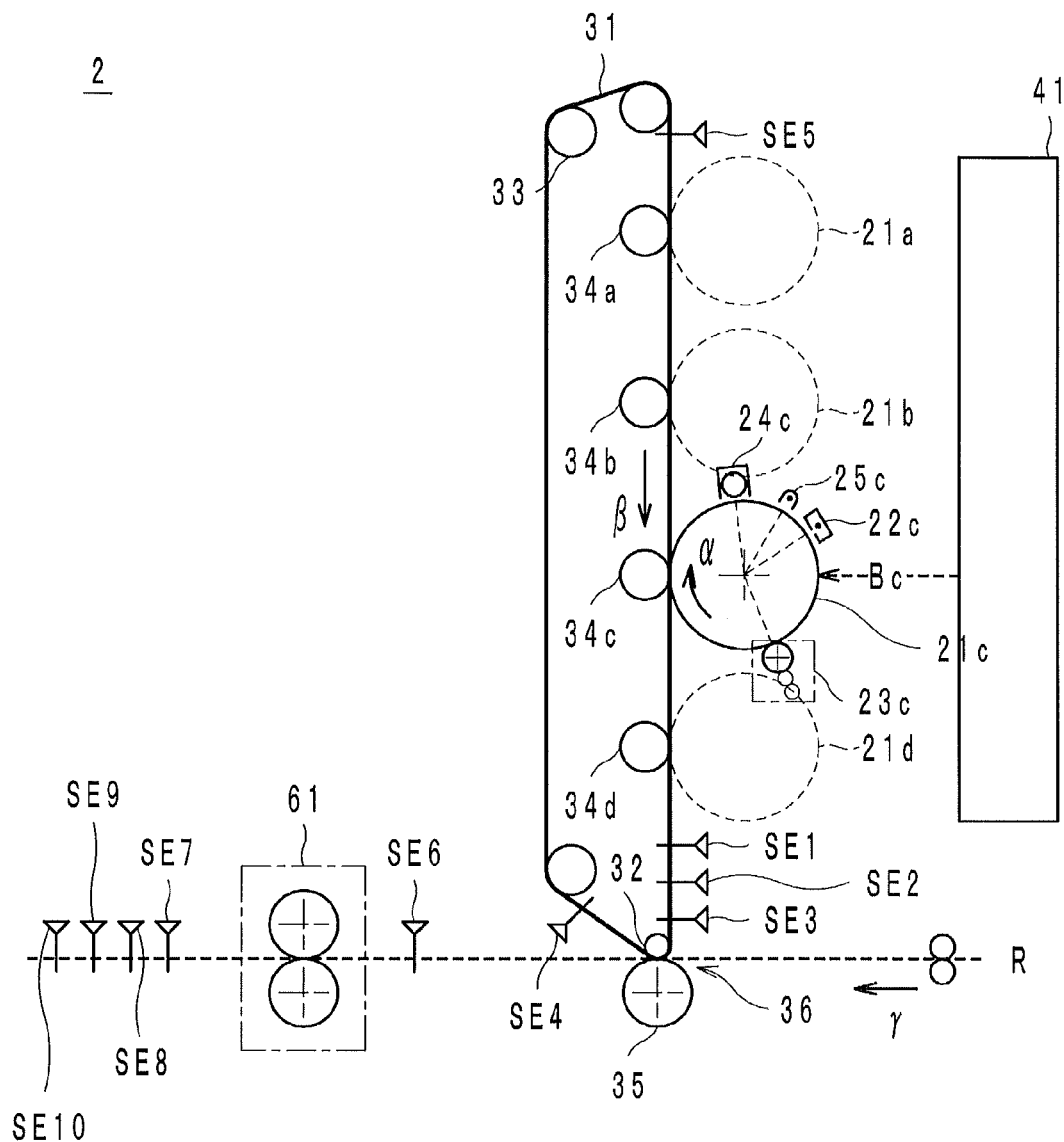
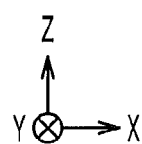

F I G . 3
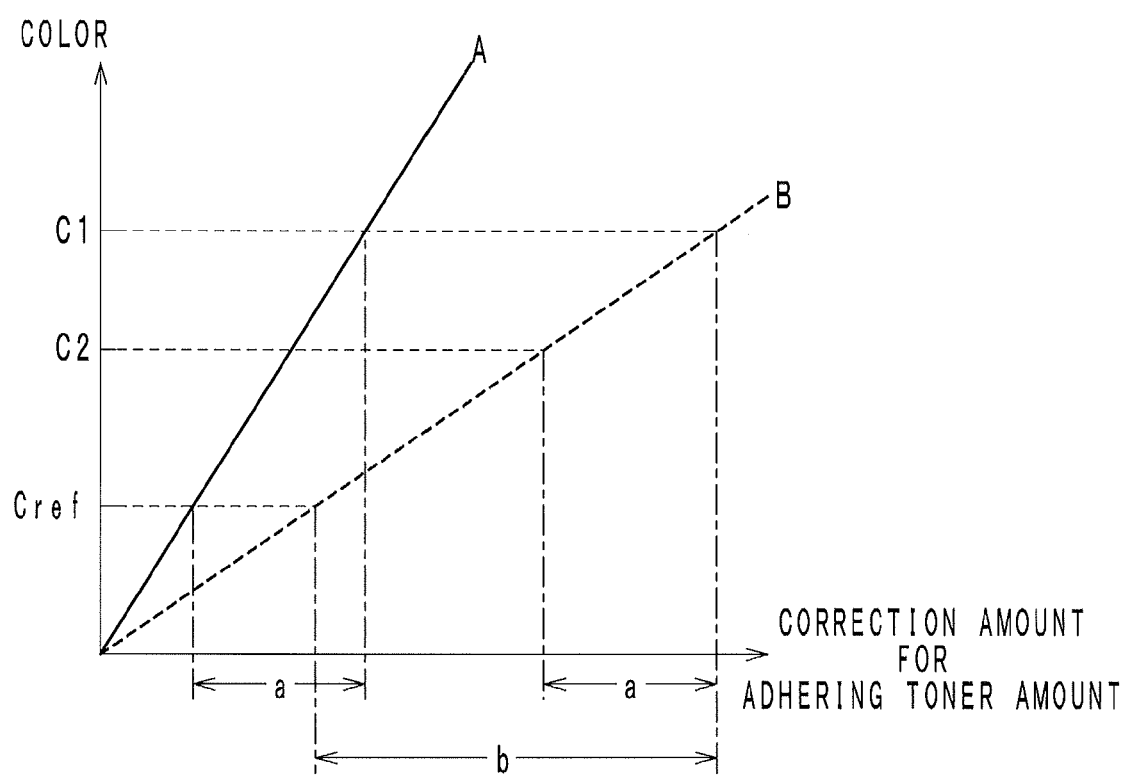

FIG. 7A

| REFERENCE COLOR Cref | ADHERING TONER AMOUNT |     | POST-CORRECTION COLOR | ADHERING TONER AMOUNT |     | PRE-CORRECTION COLOR | ADHERING TONER AMOUNT |
|---|---|---|---|---|---|---|---|
|  | LINE WIDTH |  |  | LINE WIDTH |  |  | LINE WIDTH |
|  | LINE POSITION |  |  | LINE POSITION |  |  | LINE POSITION |
|  | GLOSS |  |  | GLOSS |  |  | GLOSS |

FIG. 7B

| REFERENCE COLOR Cref | ADHERING TONER AMOUNT |     | POST-CORRECTION COLOR | ADHERING TONER AMOUNT |     | PRE-CORRECTION COLOR | ADHERING TONER AMOUNT |
|---|---|---|---|---|---|---|---|
|  | LINE WIDTH |  |  | LINE WIDTH |  |  | LINE WIDTH |
|  | LINE POSITION |  |  | LINE POSITION |  |  | LINE POSITION |
|  | GLOSS |  |  | GLOSS |  |  | GLOSS |

FIG. 7C

| REFERENCE COLOR Cref | ADHERING TONER AMOUNT |     | POST-CORRECTION COLOR | | | PRE-CORRECTION COLOR | ADHERING TONER AMOUNT |
|---|---|---|---|---|---|---|---|
|  | LINE WIDTH |  |  | LINE WIDTH |  |  | LINE WIDTH |
|  | LINE POSITION |  |  | LINE POSITION |  |  | LINE POSITION |
|  | GLOSS |  |  | GLOSS |  |  | GLOSS |

Reorganize the formula $$\begin{cases} \sum_{i=1}^{k} a_{1i} x_i = - \sum_{i=k+1}^{k+1} a_{1i} x_i \\ \sum_{i=1}^{k} a_{2i} x_i = - \sum_{i=k+1}^{k+1} a_{2i} x_i \\ \sum_{i=1}^{k} a_{3i} x_i = - \sum_{i=k+1}^{k+1} a_{3i} x_i \\ \vdots \\ \sum_{i=1}^{k} a_{ki} x_i = - \sum_{i=k+1}^{k+1} a_{ki} x_i \end{cases}$$

Create a matrix equation $$A_{kk} \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix} \begin{pmatrix} x_1 \\ x_2 \\ \vdots \\ x_k \end{pmatrix} = - \begin{pmatrix} \sum_{i=k+1}^{k+1} a_{1i} x_i \\ \sum_{i=k+1}^{k+1} a_{2i} x_i \\ \vdots \\ \sum_{i=k+1}^{k+1} a_{ki} x_i \end{pmatrix}$$

Calculate an inverse $$A_{kk}^{-1} = B = \begin{pmatrix} b_{11} & b_{12} & \cdots & b_{1k} \\ b_{21} & b_{22} & \cdots & b_{2k} \\ \vdots & \vdots & \ddots & \vdots \\ b_{k1} & b_{k2} & \cdots & b_{kk} \end{pmatrix}$$

$$A = R^{-1} = \begin{pmatrix} a_{11} & a_{12} & \cdots & a_{1k} \\ a_{21} & a_{22} & \cdots & a_{2k} \\ \vdots & \vdots & \ddots & \vdots \\ a_{k1} & a_{k2} & \cdots & a_{kk} \end{pmatrix}$$

Multiply both sides of the matrix equation by the inverse.

$$\boxed{A_{kk}^{-1}} \cdot \boxed{A_{kk}} \begin{pmatrix} x_1 \\ x_2 \\ \vdots \\ x_k \end{pmatrix} = - \boxed{A_{kk}^{-1}} \begin{pmatrix} \sum_{i=k+1}^{k+1} a_{1i} x_i \\ \sum_{i=k+1}^{k+1} a_{2i} x_i \\ \vdots \\ \sum_{i=k+1}^{k+1} a_{ki} x_i \end{pmatrix}$$

$$\begin{pmatrix} 1 & 0 & \cdots & 0 \\ 0 & 1 & \cdots & 0 \\ \vdots & \vdots & \ddots & \vdots \\ 0 & 0 & \cdots & 1 \end{pmatrix} \begin{pmatrix} x_1 \\ x_2 \\ \vdots \\ x_k \end{pmatrix} = - \boxed{B} \begin{pmatrix} \sum_{i=k+1}^{k+1} a_{1i} x_i \\ \sum_{i=k+1}^{k+1} a_{2i} x_i \\ \vdots \\ \sum_{i=k+1}^{k+1} a_{ki} x_i \end{pmatrix}$$

FIG. 13

|  | INDIVIDUAL 1 | INDIVIDUAL 2 | ... | INDIVIDUAL k |
|---|---|---|---|---|
| FIRST SHEET | $Lab_{11}$ | $Lab_{21}$ | ... | $Lab_{k1}$ |
| SECOND SHEET | $Lab_{12}$ | $Lab_{22}$ | ... | $Lab_{k2}$ |
|  | ... | ... | ... | ... |
| nTH SHEET | $Lab_{1n}$ | $Lab_{2n}$ | ... | $Lab_{kn}$ |

FIG. 14

|  | INDIVIDUAL 1 | INDIVIDUAL 2 | ... | INDIVIDUAL k |
|---|---|---|---|---|
| FIRST SHEET | $Lab_{11}$ | $Lab_{21}$ | ... | $Lab_{k1}$ |
| SECOND SHEET | $Lab_{12}$ | $Lab_{22}$ | ... | $Lab_{k2}$ |
|  | ... | ... | ... | ... |
| nTH SHEET | $Lab_{1n}$ | $Lab_{2n}$ | ... | $Lab_{kn}$ |

FIG. 15

COLOR CORRECTING SYSTEM AND IMAGE FORMING APPARATUS INCLUDING SAME

This application is based on Japanese Patent Application No. 2012-176854 filed on Aug. 9, 2012, the content of which is incorporated herein by reference.

BACKGROUND OF THE INVENTION

1. Field of the Invention

The present invention relates to a color correcting system that corrects a color included in an output image to a reference color, and an image forming apparatus including the same.

2. Description of Related Art

A conventional example of this image forming apparatus is a color image forming apparatus described in Japanese Patent Laid-Open Publication No. 2009-217086. This color image forming apparatus detects widths of lines formed on an intermediate transfer belt, and performs color correction on the basis of the detected line widths.

There are other known color correction methods in which the amount of toner adhering to the intermediate transfer belt, and widths and positions of lines are measured in order to adjust the amount of adhering toner and thereby to obtain a reference color, or in which a color in an output image subjected to fixing processing is measured in order to adjust the amount of adhering toner. Moreover, in some cases, the amount of adhering toner is adjusted on the basis of the gloss of an output image subjected to fixing processing.

However, in the case where there are a plurality of output images with different glosses, more specifically, in the case where the gloss varies among images, the amount of correction required varies. Accordingly, while conventional image forming apparatuses can appropriately correct colors in output images with a certain degree of gloss to reference colors, they have problems with output images with other degrees of gloss in that the colors in the images cannot be appropriately corrected by the same amount of correction. There are similar problems related to line widths, line positions, and amounts of adhering toner.

SUMMARY OF THE INVENTION

In an embodiment of the present invention, a color correcting system mountable in an image forming apparatus includes an imaging unit configured to perform image formation, and a control unit configured to acquire a control parameter for use in image formation by the imaging unit and a status parameter indicating a status at the time of image formation. If a value for a color in an image formed by the imaging unit does not exceed a first threshold, and at least one member selected from the group consisting of adhering toner amount, gloss, line width, and line position for the image formed by the imaging unit does not exceed a second threshold, the control unit is configured to determine a control parameter on the basis of the acquired control parameter and the acquired status parameter, such that at least a color difference decreases.

In another embodiment of the present invention, an image forming apparatus has the color correcting system mounted therein.

BRIEF DESCRIPTION OF THE DRAWINGS

FIG. 1 is a diagram illustrating the outer appearance of a general image forming apparatus;

FIG. 2 is a schematic diagram illustrating the configuration of an imaging unit in the image forming apparatus shown in FIG. 1;

FIG. 3 is a graph showing the relationship between the amount of correction for adhering toner amount and a color after correction;

FIGS. 7A and 7B are schematic diagrams showing the relationship between the factors for the difference in color and the color correction;

FIG. 7C is a schematic diagram showing color correction by a color correcting system according to an embodiment of the present invention shown in FIG. 8;

FIG. 13 is a calculation flowchart illustrating a fourth process for calculating optimum values;

FIG. 14 is a schematic table illustrating an example of a learning method;

FIG. 15 is a schematic table illustrating another example of a learning method;

DETAILED DESCRIPTION OF THE PREFERRED EMBODIMENTS

Preliminary Notes

Figure 4:
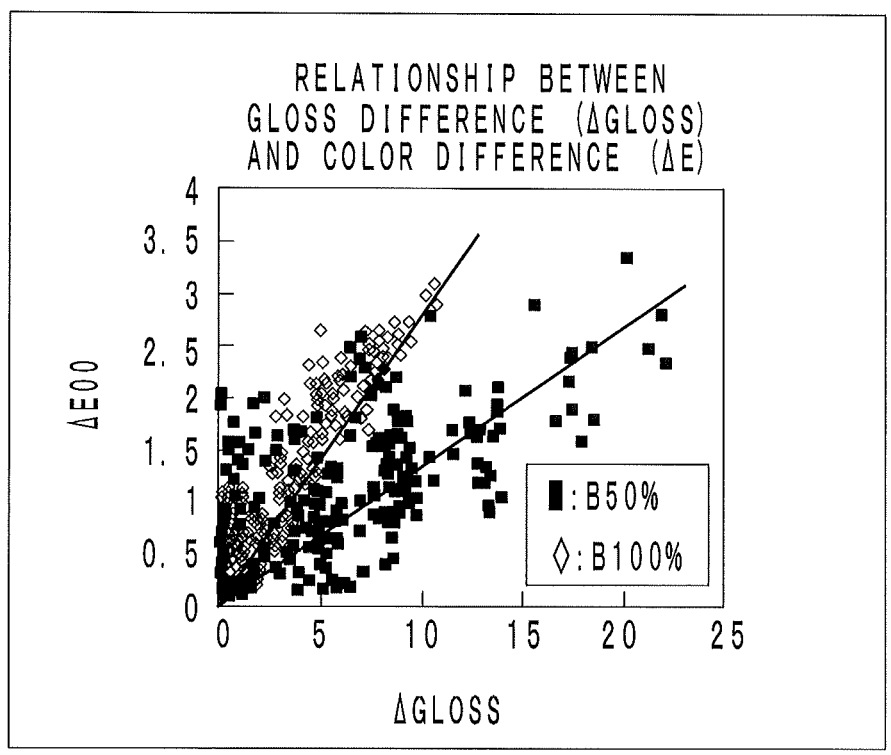
FIG. 4 is a graph showing the relationship between the difference in gloss and the difference in color.

First, the configuration and the operation of a general image forming apparatus will be described below with reference to the drawings. In some figures, the X-, Y-, and Z-axes represent the left-right (width) direction, the front-back (depth) direction, and the top-bottom (height) direction, respectively, of the image forming apparatus. Moreover, the lowercase alphabetic characters a, b, c, and d added at ends of reference numerals are suffixes respectively representing yellow (Y), magenta (M), cyan C, and black (Bk). For example, a photoreceptor drum $21a$ refers to a photoreceptor drum $21$ for yellow.

General Configuration of Image Forming Apparatus

In FIG. 1, an image forming apparatus 1 is a tandem electrophotographic full-color digital printing system at least including an imaging unit 2.

Photoreceptor drums $21a$, $21b$, $21c$, and $21d$ are arranged in order from top to bottom in the imaging unit 2, as shown in FIG. 2. The photoreceptor drums $21a$ to $21d$ are in the form of cylinders extending in the front-back direction, and they rotate, for example, clockwise (the direction of arrow $\alpha$) about the axes of the cylinders.

A charge unit $22c$, a developing unit $23c$, a cleaning unit $24c$, and a diselectrifying unit $25c$ are provided in order in the rotational direction a around the photoreceptor drum $21c$.

Note that, as with the photoreceptor drum 21c, the photoreceptor drums 21a, 21b, and 21d have their charge units, developing units, cleaning units, and diselectrifying units arranged around them. However, due to space limitations, these units are not shown in FIG. 2.

An intermediate transfer belt 31 is provided to the left of the photoreceptor drums 21a to 21d. The intermediate transfer belt 31 is stretched around a plurality of rollers, including rollers 32 and 33, and is driven to rotate clockwise as indicated by arrow β.

Primary transfer rollers 34a to 34d are provided in positions opposed to the photoreceptor drums 21a to 21d with respect to the intermediate transfer belt 31. There is a primary transfer area between the primary transfer roller 34a and the intermediate transfer belt 31. Similarly, there are primary transfer areas between the primary transfer rollers 34b to 34d and the intermediate transfer belt 31.

Furthermore, a secondary transfer roller 35 is in tight contact with the intermediate transfer belt 31 in a position opposed to the roller 32 with respect to the intermediate transfer belt 31. A nip is formed between the secondary transfer roller 35 and the intermediate transfer belt 31 as a secondary transfer area 36.

Furthermore, an exposing unit 41 is provided to the right of the photoreceptor drums 21a to 21d.

Furthermore, although not shown in the figure, a sheet cassette with sheet materials stacked therein is positioned to the right of the imaging unit 2. The sheet materials are fed one by one from the sheet cassette to a transportation path R indicated by a dotted line in the figure, and transported toward the downstream (indicated by arrow γ). The secondary transfer area 36 is provided in the transportation path R, and a fusing unit 61 is provided downstream from the secondary transfer area 36 in the transportation path R.

General Operation of Image Forming Apparatus

Next, the imaging by the image forming apparatus 1 will be outlined. The charge unit 22c charges the circumferential surface of the photoreceptor drum 21c. The exposing unit 41 irradiates the charged circumferential surface of the photoreceptor drum 21c with an optical beam Bc modulated with image data (exposure). As a result, an electrostatic latent image in the corresponding color is formed on the circumferential surface of the photoreceptor drum 21c.

The developing unit 23c supplies frictionally charged toner to the photoreceptor drum 21c supporting the electrostatic latent image (development). Moreover, a development bias voltage is applied to a development roller included in the developing unit 23c. As a result, a toner image is formed on the circumferential surface of the photoreceptor drum 21c.

The toner image on the photoreceptor drum 21c is electrostatically transferred onto the intermediate transfer belt 31 at the primary transfer area by a voltage being applied to the primary transfer roller 34c (primary transfer).

The operation of transferring the cyan toner image onto the intermediate transfer belt 31 has been described above. As with the cyan toner image, yellow, magenta, and black toner images are also transferred onto the intermediate transfer belt 31. As a result of primary transfer for each color, a full-color composite toner image is formed on the intermediate transfer belt 31. The composite toner image is carried to the secondary transfer area 36 while being supported on the intermediate transfer belt 31.

Here, the toner that is left untransferred by primary transfer remains on the circumferential surface of the photoreceptor drum 21c as untransferred toner. The untransferred toner is carried to the cleaning unit 24c through rotation of the photoreceptor drum 21c. The cleaning unit 24c is provided downstream from the primary transfer area in the rotational direction a, and is adapted to scrape untransferred toner off the photoreceptor drum 21c (cleaning). Note that untransferred toner in the other colors is scraped off in the same manner as the untransferred cyan toner.

Furthermore, any trace of the electrostatic latent image that remains on the circumferential surface of the photoreceptor drum 21c is erased through whole image exposure by the diselectrifying unit 25c, which is a well-known component. Note that any traces of the electrostatic latent images in the other colors are also erased in the same manner as the cyan electrostatic latent image.

Furthermore, a sheet material fed from the sheet cassette is carried in the transportation path R to contact a timing roller pair (not shown) at rest. Thereafter, the timing roller pair start rotating in synchronization with the transfer timing at the secondary transfer area 36, thereby feeding the sheet material temporarily at rest, downstream toward the secondary transfer area 36.

In the secondary transfer area 36, the composite toner image on the intermediate transfer belt 31 is transferred onto the sheet material introduced from the timing roller pair (secondary transfer). The sheet material having received secondary transfer is fed downstream of the transportation path R by the secondary transfer roller 35 and the intermediate transfer belt 31.

The fusing unit 61 has a fusing roller and a pressure roller. The sheet material fed from the secondary transfer area 36 is introduced between these rollers. The fusing roller and the pressure roller heat and press the sheet material passing therebetween, thereby fixing the toner image on the sheet material. Thereafter, the fusing roller and the pressure roller feed the sheet material subjected to the fixing processing, toward the downstream of the transportation path R. The sheet material that has been fed passes through unillustrated ejection rollers to be ejected onto an output tray.

Details of Problem with Conventional Image Forming Apparatuses

Incidentally, conventional image forming apparatuses have an issue in properly correcting a color in one or some of the output images that vary in gloss or suchlike as mentioned earlier. This issue will be described in detail below.

For example, a case where the amount of adhering toner is corrected will be described. In FIG. 3, line A represents the relationship between the amount of correction and a color after correction where the gloss of an output image is A, and line B represents the relationship between the amount of correction and a color after correction where the gloss of an output image is B. In the case where the gloss is A, the amount of correction for adjusting a color C1 of the output image to a reference color Cref is a. However, in the case where the gloss is B, even if the color C1 of the output image is corrected by the amount of correction a, the resultant color is C2, rather than the reference color Cref. In other words, the resultant color is not sufficiently corrected. In the case where the gloss is B, the color C1 of the output image needs to be corrected by the amount of correction b to obtain the reference color Cref.

However, as shown in FIG. 4, there seems to be a correlation between the gloss and the color, but such a correlation is variable. Therefore, it is difficult to uniquely determine the relationship between the color of the output image and the amount of correction. This tendency becomes more noticeable as the required accuracy of the color increases.

While the foregoing has been given with respect to the relationship between the gloss and the color, the same can be said of the relationship between the line width and the color, the relationship between the line position and the color, and the relationship between the amount of adhering toner and the color.

Figure 5A:
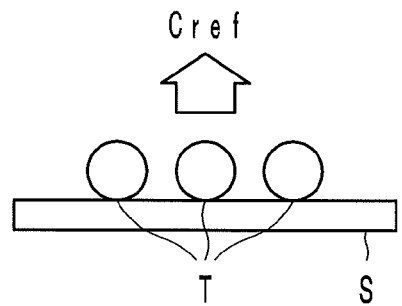
FIGS. 5A, 5B, and 5C are schematic diagrams illustrating factors for the difference in color.
Figure 5B:
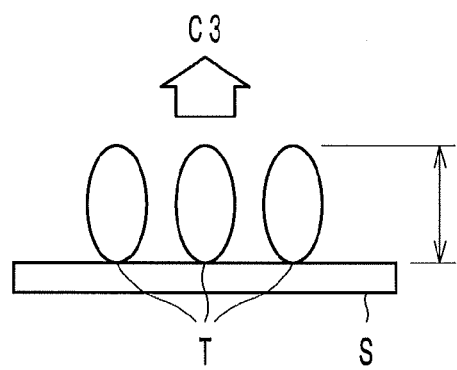
Figure 5C:
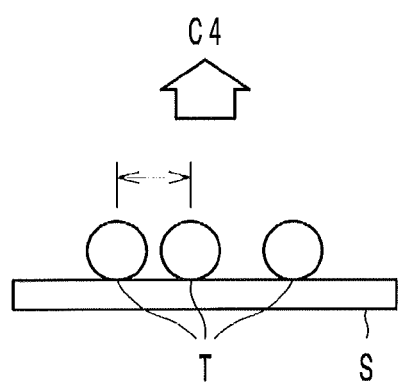
Figure 6A:
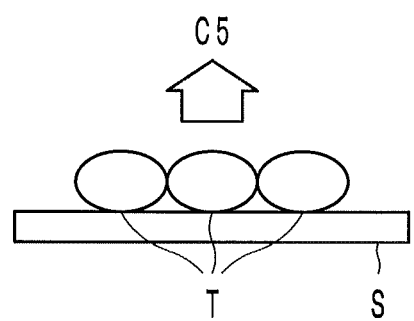
FIGS. 6A and 6B are diagrams illustrating the relationship between the factors for the difference in color and the color correction.
Figure 6B:
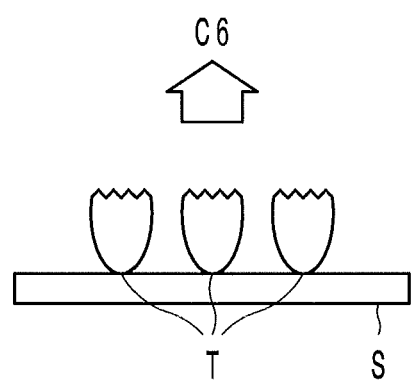

Here, factors for the difference in color will be described with reference to FIGS. 5A, 5B, 5C, 6A, and 6B. When a proper amount of toner T appropriately adheres to a sheet material S, as shown in FIG. 5A, the reference color Cref is developed. However, when the amount of adhering toner T varies, as shown in FIG. 5B, a color C3 (≠Cref) is developed. When the line position varies, as shown in FIG. 5C, a color C4 (≠Cref≠C3) is developed. When the line width varies, as shown in FIG. 6A, a color C5 (≠Cref≠C3≠C4) is developed. When the gloss varies, as shown in FIG. 6B, a color C6 (≠Cref≠C3≠C4≠C5) is developed.

Next, the relationship between the factors for the difference in color and the correction will be described with reference to FIGS. 7A and 7B. In the case where only the amount of adhering toner varies, as shown in FIG. 7A, a color C7 in an output image can be corrected to the reference color Cref simply by correcting the amount of adhering toner. However, in the case of a color C8 in an output image, which differs from the reference color Cref in at least two of the following: adhering toner amount; line width; line position; and gloss, as shown in FIG. 7B, the color C8 can be corrected so as to approximate to the reference color Cref to a certain degree, but it is difficult to accurately correct the color C8 to the reference color Cref. Note that FIG. 7C, shown below FIG. 7B, will be described later.

Configuration of Color Correcting System

Figure 8:
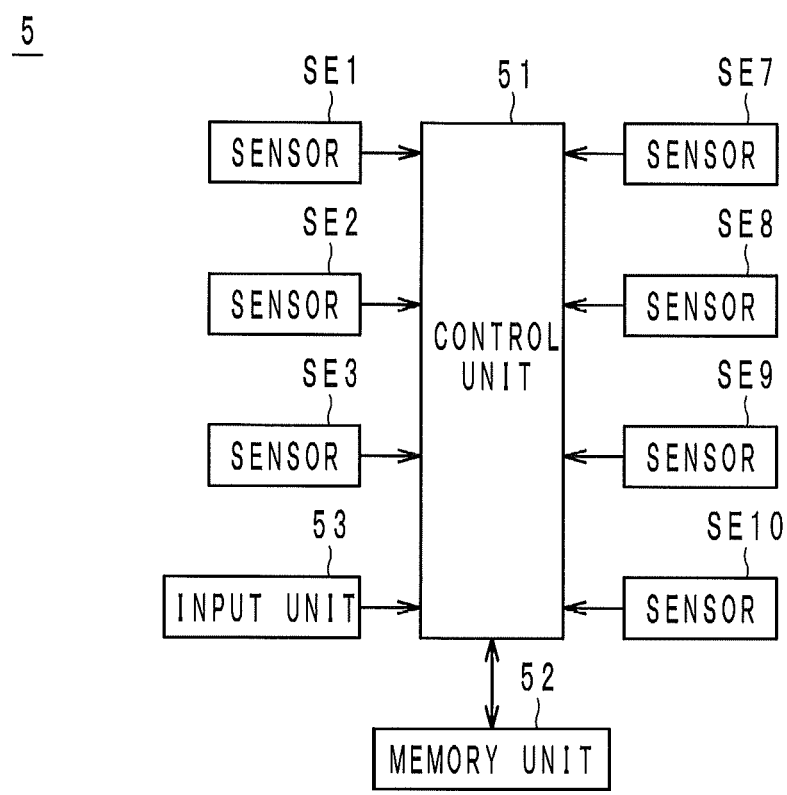
FIG. 8 is a block diagram illustrating the configuration of the color correcting system.

To solve the above problem, the image forming apparatus 1 is equipped with a color correcting system 5 having a configuration as shown in FIG. 8. In FIG. 8, the color correcting system 5 at least includes a control unit 51, a memory unit 52, an input unit 53, sensors SE1 to SE3, and sensors SE7 to SE10.

The control unit 51 is, for example, a microcomputer or a CPU, which is adapted to execute a program previously stored in the memory unit 52, thereby correcting a color in an output image on the basis of information from the input unit 53, an output from the sensor SE10, and outputs from the sensors SE1 to SE3 or the sensors SE7 to SE9. In addition, the control unit 51 controls the imaging as described earlier.

The input unit 53 is a touch panel or suchlike, which can be manually operated by an operator to select various conditional options. In the present embodiment, the input unit 53 prompts the operator to select a unit space mode from among a plurality of options displayed thereon. The input unit 53 notifies the control unit 51 of the unit space mode selected by the operator.

The sensor SE1 is provided near the intermediate transfer belt 31, immediately downstream from the photoreceptor drum 21*d*, which is located most downstream among the photoreceptor drums 21*a* to 21*d*, as shown in FIG. 2. The sensor SE1 detects a toner density in a composite toner image supported on the intermediate transfer belt 31. In other words, the sensor SE1 detects the amount of toner adhering to the intermediate transfer belt 31 after primary transfer for all colors.

The sensors SE2 and SE3 are provided substantially in the same position as the sensor SE1. The sensors SE2 and SE3 detect a line width and a line position for the toner adhering to the intermediate transfer belt 31. Note that the sensors SE2 and SE3 can be realized by well-known technology.

Furthermore, the sensor SE7 is provided immediately downstream from the fusing unit 61 in the transportation path R. The sensor SE7 is a well-known gloss sensor, and detects the gloss of an image printed on a sheet material fed from the fusing unit 61.

The sensors SE8 and SE9 are provided substantially in the same position as the sensor SE7. The sensors SE8 and SE9 detect a line width and a line position for the image printed on the sheet material fed from the fusing unit 61. Note that the sensors SE8 and SE9 can be realized by well-known technology.

The sensor SE10 is provided substantially in the same position as the sensors SE7 to SE9. The sensor SE10 detects a color in the image printed on the sheet material fed from the fusing unit 61. Note that the sensor SE10 can also be realized by well-known technology.

Note that FIG. 2 also illustrates sensors SE4 to SE6, but they are not indispensable components for the color correcting system 5, and therefore any descriptions thereof will be omitted.

The values detected by the sensors SE1 to SE3 and the sensors SE7 to SE10 are outputted to the control unit 51, as shown in FIG. 8.

Operation of Color Correcting System

Hereinafter, processes related to the image forming apparatus 1 including the color correcting system 5 will be described. First, a unit space data learning process to be performed before the shipment of the image forming apparatus 1 will be described with reference to FIG. 9, and thereafter, a color correction process to be performed after the shipment of the image forming apparatus 1 will be described with reference to FIG. 10.

Figure 9:
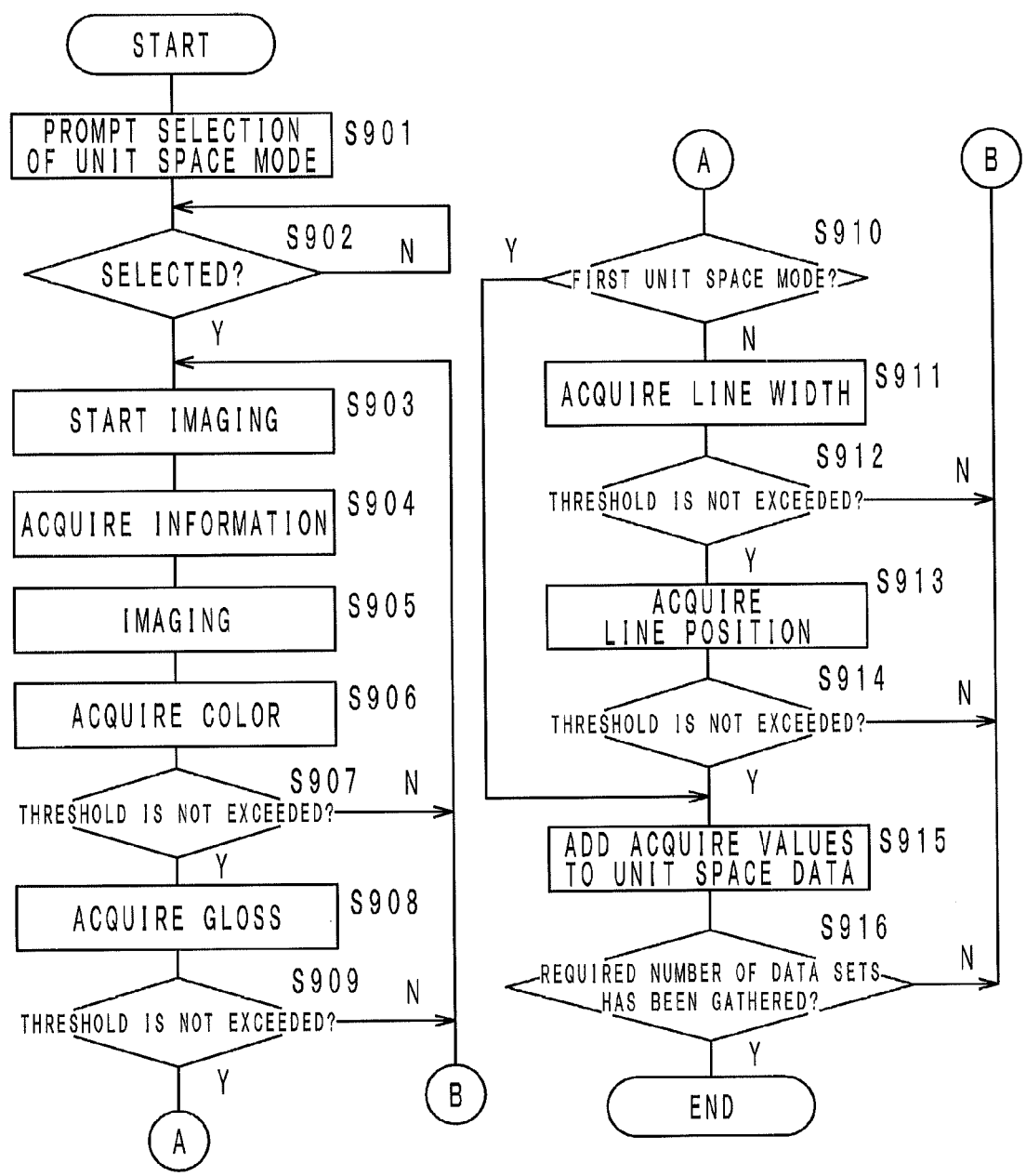
FIG. 9 is a flowchart of a unit space data learning process performed before the shipment of the image forming apparatus.

In FIG. 9, after the program in the memory unit 52 starts to be executed, the control unit 51 initially causes the input unit 53 to display a plurality of unit space modes, thereby prompting the operator into selection (S901). Examples of the unit space modes in the present embodiment are first and second unit space modes. The first unit space mode is a mode in which to form a unit space using data for color and gloss not exceeding their individual thresholds. The second unit space mode is a mode in which to form a unit space using data for color, gloss, line position, and line width not exceeding their individual thresholds.

Once the operator selects a unit space mode (S902), the control unit 51 starts imaging (S903). Moreover, the control unit 51 acquires information about the imaging started in S903 (S904). The information acquired in S904 includes, for example, control parameters such as a grid voltage of the charge unit, a development bias voltage, light exposure, and a temperature of the fusing unit. In addition, the acquired information also includes status parameters such as an ambient temperature, an ambient humidity, and a toner-to-carrier ratio (TCR). Based on the above information, the control unit 51 performs image formation, i.e., imaging, on a sheet material (S905).

Next, the control unit 51 acquires a detection value that specifies a color in the image generated in S905 from the sensor SE10 (S906). Thereafter, the control unit 51 determines whether or not the detection value acquired in S906 exceeds a predetermined threshold (S907). A specific example of the processing in S907 is a determination as to whether the difference in color ΔE00 from the reference color is or is not 1 or less.

If the determination in S907 results in NO (denoted below by "N"), the procedure returns to S903 in order to generate another image. On the other hand, if the determination in S907 results in YES (denoted below by "Y"), the procedure advances to S908.

The control unit 51 acquires a detection value that specifies the gloss of the image generated in S905 from the sensor SE7 (S908). Thereafter, the control unit 51 determines whether or not the detection value acquired in S908 exceeds a predetermined threshold (S909). A specific example of the processing in S909 is a determination as to, for example, whether the difference in gloss from the reference color at a reflection angle of 75 degrees is or is not 10 degrees or less.

If the determination in S909 results in N, the procedure returns to S903 in order to generate another image. On the other hand, if the determination in S909 results in Y, the procedure advances to S910.

Next, the control unit 51 determines whether or not the unit space mode selected in S902 is the first unit space mode (S910).

If the determination in S910 results in Y, information for line width and line position is not necessary, and therefore, the procedure advances to S915. On the other hand, if the determination in S910 results in N, the second unit space mode has been selected, so that information for line width and line position is necessary, and therefore, the procedure advances to S911.

The control unit 51 acquires a detection value that specifies a line width for the image generated in S905 from the sensor SE8 (S911). Thereafter, the control unit 51 determines whether or not the detection value acquired in S911 exceeds a predetermined threshold (S912). A specific example of the processing in S912 is a determination as to whether or not the line width is 220±20 μm or less, where the imaging condition is a line width of 4 dots at a resolution of 600 dots per inch (dpi).

If the determination in S912 results in N, the procedure returns to S903 in order to generate another image. On the other hand, if the determination in S912 results in Y, the procedure advances to S913.

The control unit 51 acquires a detection value that specifies a line position for the image generated in S905 from the sensor SE9 (S913). Thereafter, the control unit 51 determines whether or not the detection value acquired in S913 exceeds a predetermined threshold (S914). A specific example of the processing in S914 is a determination as to whether the maximum positional deviation among the colors Y, M, C, and K is or is not 50 μm or less.

If the determination in S914 results in N, the procedure returns to S903 in order to generate another image. On the other hand, if the determination in S914 results in Y, the procedure advances to S915.

The control unit 51 adds the information acquired in S904 to unit space data (S915). Specifically, in the case where the first unit space mode was selected in S902, the acquired information is added to unit space data if the color and the gloss do not exceed their respective thresholds. On the other hand, in the case where the second unit space mode was selected, the acquired information is added to unit space data if the color, the gloss, the line position, and the line width do not exceed their individual thresholds.

The control unit 51 repeats a series of processing steps S903 to S916 until a required number of unit space data sets is gathered (S916).

Figure 10:
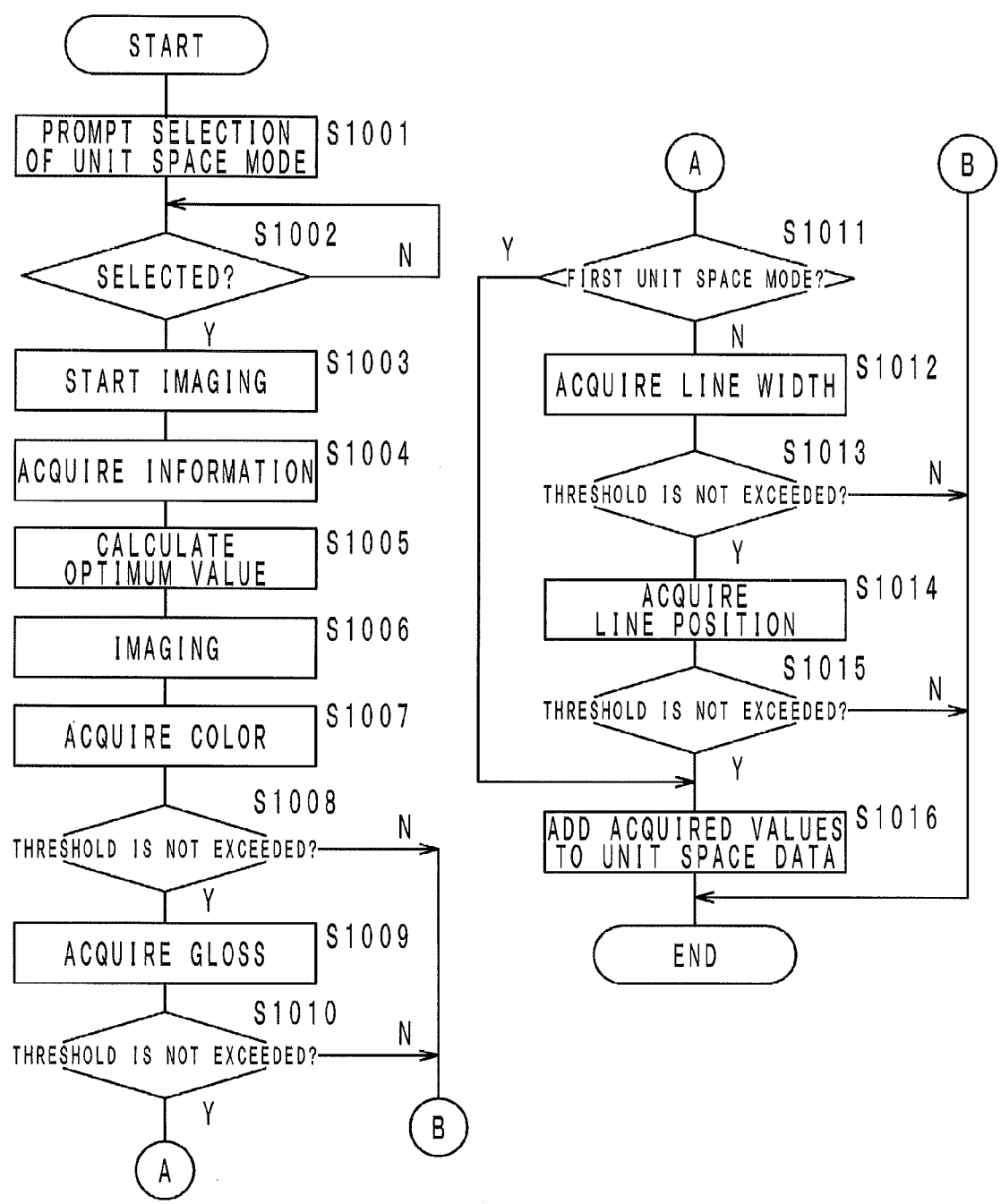
FIG. 10 is a flowchart for a color correction process performed after the shipment of the image forming apparatus.

In FIG. 10, the control unit 51 performs processing steps similar to S901 to S904 of FIG. 9 (S1001 to S1004), and thereafter, the control unit 51 calculates a Mahalanobis distance (MD) value on the basis of information acquired in S1004. In this calculation, the control unit 51 obtains an optimum value for each control parameter (i.e., the grid voltage of the charge unit, the development bias voltage, the light exposure, the temperature of the fusing unit, etc.) in order to minimize the MD value (S1005). A specific method for calculating the optimum values will be described later.

Next, the control unit 51 performs image formation, i.e., imaging, on a sheet material on the basis of the optimum values for the control parameters (S1006).

Next, the control unit 51 acquires a detection value that specifies a color in the image generated in S1006 from the sensor SE10 (S1007). Thereafter, as in S907, the control unit 51 determines whether or not the detection value acquired in S1007 exceeds a predetermined threshold (S1008).

If the determination in S1008 results in N, the procedure of FIG. 10 ends, but if the result is Y, the procedure advances to S1009.

The control unit 51 acquires a detection value that specifies the gloss of the image generated in S1006 from the sensor SE7 (S1009). Thereafter, as in S909, the control unit 51 determines whether or not the detection value acquired in S1009 exceeds a predetermined threshold (S1010).

If the determination in S1010 results in N, the procedure ends, but if the result is Y, the procedure advances to S1011.

Next, as in S910, the control unit 51 determines whether or not the unit space mode selected in S1002 is the first unit space mode (S1011).

If the determination in S1011 results in Y, information for line width and line position is not necessary, and therefore, the procedure advances to S1016. On the other hand, if the result is N, the procedure advances to S1012.

The control unit 51 acquires a detection value that specifies a line width for the image generated in S1006 from the sensor SE8 (S1012). Thereafter, as in S912, the control unit 51 determines whether or not the detection value acquired in S1012 exceeds a predetermined threshold (S1013).

If the determination in S1013 results in N, the procedure ends, but if the result is Y, the procedure advances to S1014.

The control unit 51 acquires a detection value that specifies a line position for the image generated in S1006 from the sensor SE9 (S1014). Thereafter, as in S914, the control unit 51 determines whether or not the detection value acquired in S1014 exceeds a predetermined threshold (S1015).

If the determination in S1015 results in N, the procedure ends, but if the result is Y, the procedure advances to S1016.

The control unit 51 adds information consisting of the control parameters having been calculated in S1005 and combined with status parameters, to unit space data (S1016).

Method for Calculating Optimum Values in S1005

In the first process, if unit space data is selected, each data set is standardized for each characteristic item (e.g., the grid voltage of the charge unit, ambient temperature, etc.), as shown in Table 1 below.

TABLE 1

| | | ADJUSTABLE ITEMS (CONTROL PARAMETERS k | | | FIXED ITEMS (STATUS PARAMETERS l | |
|---|---|---|---|---|---|---|
| 1. Choose unit space data. | SAMPLE NO. | VARIABLE 1 | VARIABLE 2 | VARIABLE 3 | ... | VARIABLE k |
| | 1 | $x_{11}$ | $x_{12}$ | $x_{13}$ | ... | $x_{1k}$ |
| | 2 | $x_{21}$ | $x_{22}$ | $x_{23}$ | ... | $x_{2k}$ |
| n DATA SETS | 3 | $x_{31}$ | $x_{32}$ | $x_{33}$ | ... | $x_{3k}$ |
| | : | : | : | : | | : |
| | n | $x_{n1}$ | $x_{n2}$ | $x_{n3}$ | ... | $x_{nk}$ |
| | AVERAGE | $x_1$ | $x_2$ | $x_3$ | ... | $x_k$ |
| | STANDARD DEVIATION | $\sigma_1$ | $\sigma_2$ | $\sigma_3$ | ... | $\sigma_k$ |

2. Standardize the data.

$$X = x - m/\sigma$$

| SAMPLE NO. | VARIABLE 1 | VARIABLE 2 | VARIABLE 3 | ... | VARIABLE k |
|---|---|---|---|---|---|
| 1 | $x_{11}$ | $x_{12}$ | $x_{13}$ | ... | $x_{1k}$ |
| 2 | $x_{21}$ | $x_{22}$ | $x_{23}$ | ... | $x_{2k}$ |
| 3 | $x_{31}$ | $x_{32}$ | $x_{33}$ | ... | $x_{3k}$ |
| : | : | : | : | | : |
| n | $x_{n1}$ | $x_{n2}$ | $x_{n3}$ | ... | $x_{nk}$ |
| AVERAGE | 0 | 0 | 0 | ... | 0 |
| STANDARD DEVIATION | 1 | 1 | 1 | ... | 1 |

In the second process, a correlation coefficient matrix between items is calculated, as shown in Formula (1) below. Moreover, an inverse of the correlation coefficient matrix is calculated, as shown in Formula (2) below.

1. Calculate a correlation coefficient matrix between items.

$$R = \begin{bmatrix} 1 & r_{12} & \cdots & r_{1k} \\ r_{21} & 1 & \cdots & r_{2k} \\ \vdots & \vdots & & \vdots \\ r_{k1} & r_{k2} & \cdots & 1 \end{bmatrix} \quad (1)$$

$$r_{ij} = \left(\sum X_{il} \times X_{jl}\right)/n \quad (l = 1, 2, \ldots, n)$$

2. Calculate an inverse of the correlation coefficient matrix.

$$A = R^{-1} = \begin{bmatrix} a_{11} & a_{12} & \cdots & a_{1k} \\ a_{21} & a_{22} & \cdots & a_{2k} \\ \vdots & \vdots & & \vdots \\ a_{k1} & a_{k2} & \cdots & a_{kk} \end{bmatrix} \quad (2)$$

In the third process, a relational expression is created such that a partial differentiation value for the MD value is 0 (see Formula (3) below).

The MD value is defined by the following formula.

$$MD_l^2 = \frac{1}{k+l}[x_{i1} \ \ldots \ x_{i(k+l)}] A \begin{bmatrix} x_{i1} \\ \vdots \\ x_{1(k+l)} \end{bmatrix}$$

The above formula is developed as shown below.

$$MD^2 = a_{11}x_1^2 + a_{22}x_2^2 + \ldots + a_{kk}x_k^2 + a_{12}x_1x_2 +$$

-continued $$a_{13}x_1x_3 + \ldots + a_{1k}x_1x_k + a_{21}x_2x_1 + a_{23}x_2x_3 + \ldots +$$

$$a_{2k}x_k2x_k \vdots + a_{k1}x_kx_1 + a_{k2}x_kx_2 + \ldots + a_{k(k-1)}x_kx_{k-1} +$$

$$2a_{1(k+1)}x_1x_{k+1} + \ldots + 2a_{1(k+1)}x_1x_{k+1} \ldots + 2a_{k(k+1)}x_kx_{k+1} + \ldots +$$

$$2a_{k(k+1)}x_kx_{k+1} + a_{(k+1)(k+1)}x_{k+1}x_{k+1} + \ldots + a_{(k+1)(k+1)}x_{k+1}x_{k+1}$$

Convert the MD value to 0 by partial differentiation with $x_{il}$ to $x_{ik}$.

$$\begin{cases} \frac{\partial f}{\partial x_1} = 2a_{11}x_1 + 2\sum_{i=2}^{k} a_{1i}x_i + 2\sum_{i=k+1}^{k+1} a_{1i}x_i = 0 \\ \frac{\partial f}{\partial x_2} = 2a_{22}x_2 + 2\sum_{i=1}^{1} a_{2i}x_i + 2\sum_{i=3}^{k} a_{2i}x_i + 2\sum_{i=k+1}^{k+1} a_{2i}x_i = 0 \\ \frac{\partial f}{\partial x_3} = 2a_{33}x_3 + 2\sum_{i=1}^{2} a_{2i}x_i + 2\sum_{i=4}^{k} a_{2i}x_i + 2\sum_{i=k+1}^{k+1} a_{2i}x_i = 0 \\ \vdots \\ \frac{\partial f}{\partial x_k} = 2a_{kk}x_k + 2\sum_{i=1}^{k-1} a_{ki}x_i + 2\sum_{i=k+1}^{k+1} a_{ki}x_i = 0 \end{cases} \quad (3)$$

In the fourth process shown in FIG. 13, Formula (3) is initially reorganized to create a matrix equation, as shown below. Moreover, an inverse of matrix $A_{kk}$ included in the matrix equation is calculated, and the matrix equation is left-multiplied by the inverse.

In the fifth process, a system of equations is solved to calculate standardized control variables, as shown below. Thereafter, these values are converted into unstandardized variables.

Calculate an estimate of each control variable.

$$\begin{pmatrix} x_1 \\ x_2 \\ \vdots \\ x_k \end{pmatrix} = -B \begin{pmatrix} \sum_{i=k+1}^{k+1} a_{1i}x_i \\ \sum_{i=k+1}^{k+1} a_{2i}x_i \\ \sum_{i=k+1}^{k+1} a_{ki}x_i \end{pmatrix}$$

$$\hat{x}_1 = x_1 = -\left(b_{11}\sum_{i=k+1}^{k+1} a_{1i}x_i + b_{12}\sum_{i=k+1}^{k+1} a_{2i}x_i + \ldots + b_{1k}\sum_{i=k+1}^{k+1} a_{ki}x_i\right)$$

$$\hat{x}_2 = x_2 = -\left(b_{21}\sum_{i=k+1}^{k+1} a_{1i}x_i + b_{22}\sum_{i=k+1}^{k+1} a_{2i}x_i + \ldots + b_{2k}\sum_{i=k+1}^{k+1} a_{ki}x_i\right)$$

$$\hat{x}_k = x_k = -\left(b_{k1}\sum_{i=k+1}^{k+1} a_{1i}x_i + b_{k2}\sum_{i=k+1}^{k+1} a_{2i}x_i + \ldots + b_{kk}\sum_{i=k+1}^{k+1} a_{ki}x_i\right)$$

Calculate an unstandardized (actual) control variable.

$$x=(X\times\sigma)+m$$

In this manner, in the present embodiment, with the partial differential equation where the MD value=0, the local minimum value (the smallest value) for the MD value is calculated.

Pre-Shipment Unit Space Data Learning Method

As mentioned earlier, the unit space data learning process is performed on the color correcting system 5 before the shipment of the image forming apparatus 1. FIG. 14 schematically shows the learning of unit space data among individuals of the same model (image forming apparatuses 1). Specifically, a reference color is set for each individual, and any control parameter or status parameter that corresponds to a color not exceeding a threshold determined relative to the reference color is added to unit space data. In the example of FIG. 14, $Lab_{11}$ is set as the reference color for Individual 1, and $Lab_{21}$ is set as the reference color for Individual 2.

FIG. 15 schematically shows another learning method. Specifically, the color for a given individual is set as a reference color, and any control parameter or suchlike that corresponds to a color not exceeding a threshold for the reference color is added to unit space data. The learning method shown in FIG. 15 is effective in the case where the same reference color is desired to be set for a plurality of models.

Figure 16:
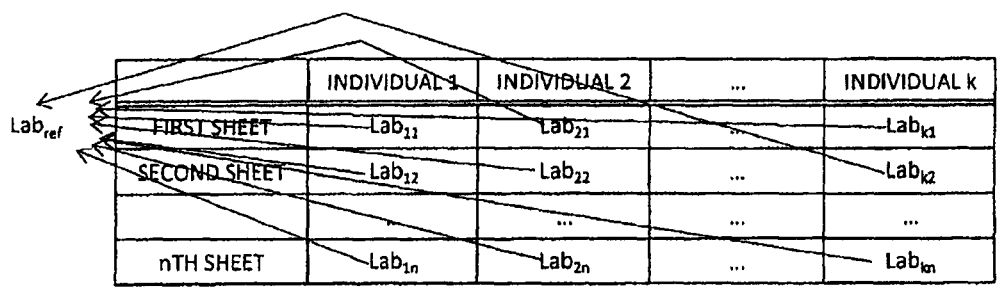
FIG. 16 is a schematic table illustrating another example of a learning method.

FIG. 16 schematically shows still another learning method. Specifically, a different reference color ($Lab_{ref}$) irrelevant to a color formed by a specific individual (image forming apparatus 1) is set. Any control parameter or suchlike that corresponds to a color not exceeding a threshold for the reference color is added to unit space data. The reference color is preferably selected in conformity with the JapanColor standards or suchlike.

Selection of Unit Space Mode

Figure 11:
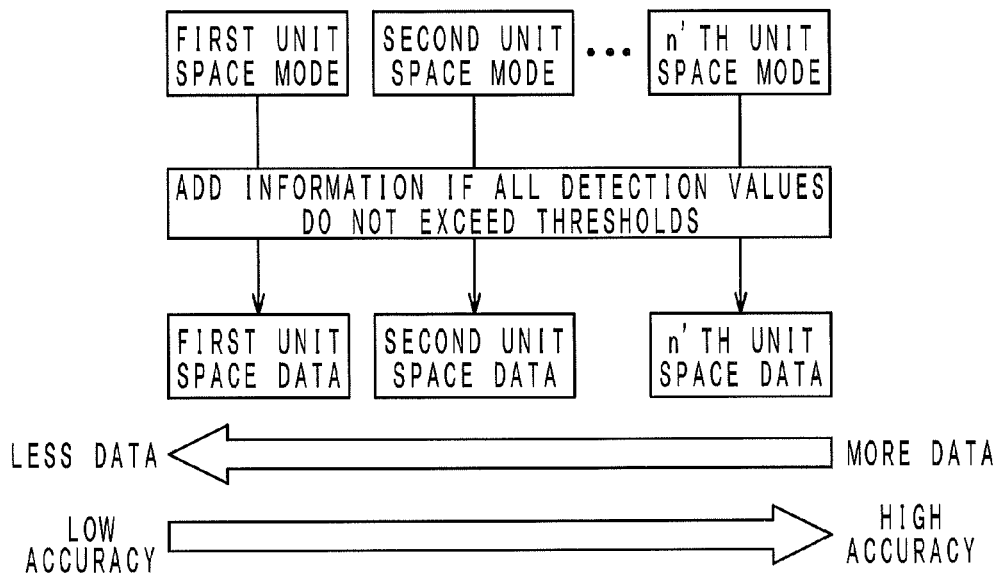
FIG. 11 is a schematic diagram illustrating the advantage in selection from among a plurality of unit space modes.

Furthermore, as mentioned earlier, the color correcting system 5 is configured so as to allow the operator to select either the first unit space mode or the second unit space mode. The color correcting system 5 may be equipped with n unit space modes (i.e., first through n'th unit space modes), rather than two, as shown in FIG. 11. In the first unit space mode, unit space data is created on the basis of, for example, determination results as to whether or not the values for gloss, line position and line width, in addition to the value for color, exceed their individual thresholds. In the second unit space mode, unit space data is created on the basis of, for example, determination results as to whether or not at least one or two of the values for gloss, line position and line width, in addition to the value for color, exceed their individual thresholds. Moreover, in the n'th unit space mode, unit space data is created only on the basis of a determination result as to whether or not the value for color exceeds its threshold. In this manner, by preparing a plurality of different unit space modes, it is rendered possible to make a trade-off decision between the amount of data to be learned and desired accuracy.

Supplementary

Figure 12:
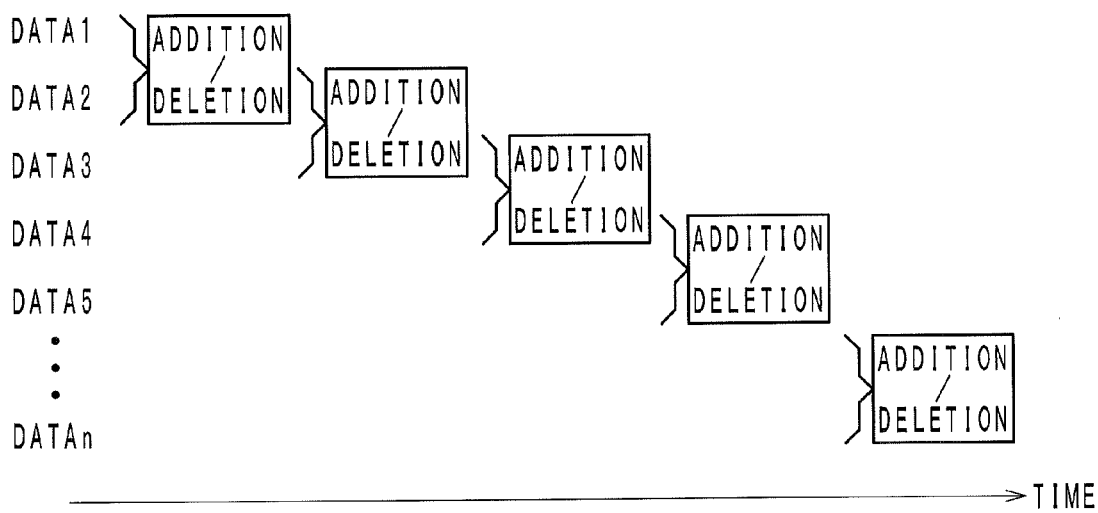
FIG. 12 is a schematic diagram illustrating deletion of unit space data.

Furthermore, if new information is added to unit space data with the color correcting system 5, and the amount of information in the unit space data exceeds a standard value, any old information for which a prescribed period has elapsed since its addition is preferably deleted from the unit space data by the control unit 51, as shown in FIG. 12. This processing allows the unit space data to be adapted to deterioration of the image forming apparatus 1 over time. In addition, this processing is preferable also from the viewpoint of saving the capacity of the memory unit 52.

Examples

Table 5 below shows calculation examples of optimum values. Here, the unit space data in Table 5 is assumed to be created on the basis of data for which the difference in color ($\Delta E00$) and the difference in gloss do not exceed their thresholds. Moreover, data other than the unit space data is assumed to be created on the basis of data for which the difference in color ($\Delta E00$) does not exceed its threshold but the difference in gloss exceeds its threshold.

For example, a case where data No. 10, which is not unit space data, is corrected to a reference color will be described. Control parameters are set such that the MD value is minimized in accordance with the above method for calculating optimum values. As can be appreciated with reference to the bottom right of Table 5, this results in improvements of a corrected image both in the difference in color ($\Delta E00$) and the difference in gloss when compared to pre-correction values. For example, it can be appreciated that setting the control parameters for data No. 10, which is not unit space data, to optimum values (see underlined values) allows the difference in color and the difference in gloss for the image to approximate to the values for the reference color.

TABLE 5

| DATA NO. | CONTROL PARAMETER | | | | | STATUS PARAMETER | | | MEASUREMENT RESULT | | CALCULATED VALUE MD VALUE |
|---|---|---|---|---|---|---|---|---|---|---|---|
| | Vg | Vdc | EXPOSURE E | PRIMARY TRANSFER CURRENT | SECONDARY TRANSFER CURRENT | FUSING TEMPERATURE | TEMPERATURE | HUMIDITY | TCR | ΔE00 | GLOSS DIFFERENCE | |

UNIT SPACE DATA

| 4 | 700 | 550 | 188 | 48 | 65486 | 203 | 71.3 | 43.9 | 0.57 | 0.44 | 1.05 | 1.1 |
| 5 | 700 | 550 | 180 | 53 | 65486 | 203 | 37.4 | 86.8 | 0.10 | 0.22 | 1.65 | 0.8 |
| 6 | 700 | 550 | 180 | 48 | 65491 | 203 | 31.1 | 49.2 | 0.97 | 0.22 | 1.45 | 0.9 |
| 7 | 700 | 550 | 180 | 48 | 65486 | 203 | 43.6 | 70.8 | 0.48 | 0.18 | 0.95 | 0.8 |
| 15 | 715 | 550 | 188 | 48 | 65481 | 203 | 14.2 | 89.5 | 0.74 | 0.15 | 0.65 | 1.1 |
| 17 | 685 | 535 | 188 | 53 | 65486 | 203 | 27.0 | 86.3 | 0.56 | 0.17 | 0.05 | 1.1 |
| 18 | 685 | 550 | 172 | 43 | 65491 | 203 | 93.2 | 58.6 | 0.49 | 0.18 | 1.25 | 1.3 |
| 22 | 700 | 565 | 172 | 48 | 65491 | 203 | 4.5 | 60.9 | 0.40 | 0.16 | 1.45 | 1.1 |
| 30 | 700 | 550 | 180 | 53 | 65486 | 203 | 22.1 | 65.8 | 0.75 | 0.25 | 1.45 | 0.8 |
| 31 | 700 | 550 | 180 | 48 | 65491 | 203 | 13.7 | 15.4 | 0.05 | 0.27 | 1.65 | 0.9 |
| 32 | 700 | 550 | 180 | 48 | 65486 | 203 | 80.0 | 41.2 | 0.33 | 0.05 | 0.25 | 0.8 |

DATA OTHER THAN UNIT SPACE DATA

| 1 | 700 | 550 | 180 | 48 | 65486 | 203 | 62.3 | 57.3 | 0.19 | 0.31 | 2.45 | 2.7 |
| 2 | 715 | 550 | 180 | 48 | 65486 | 203 | 63.0 | 10.8 | 0.92 | 0.85 | 2.05 | 3.9 |
| 3 | 700 | 565 | 180 | 48 | 65486 | 203 | 65.8 | 56.0 | 0.83 | 0.63 | 1.35 | 2.1 |
| 8 | 685 | 535 | 172 | 43 | 65481 | 198 | 38.5 | 75.5 | 0.31 | 1.05 | 0.55 | 15.6 |
| 9 | 685 | 550 | 180 | 48 | 65486 | 203 | 84.6 | 82.2 | 0.88 | 0.61 | 0.75 | 2.4 |
| 10 | 685 | 565 | 188 | 53 | 65491 | 208 | 89.4 | 34.2 | 0.26 | 2.36 | 2.55 | 12.4 |
| 11 | 700 | 535 | 172 | 48 | 65486 | 208 | 52.7 | 49.8 | 0.81 | 1.78 | 1.35 | 5.7 |
| 12 | 700 | 550 | 180 | 53 | 65491 | 198 | 31.4 | 35.8 | 0.87 | 0.17 | 2.45 | 1.6 |
| 13 | 700 | 565 | 188 | 43 | 65481 | 203 | 12.4 | 0.2 | 0.75 | 1.53 | 2.35 | 4.4 |
| 14 | 715 | 535 | 180 | 43 | 65491 | 203 | 72.1 | 26.2 | 0.66 | 1.50 | 1.75 | 7.2 |
| 16 | 715 | 565 | 172 | 53 | 65486 | 198 | 29.8 | 49.1 | 0.35 | 0.41 | 2.15 | 4.7 |
| 19 | 685 | 565 | 180 | 48 | 65481 | 198 | 61.6 | 0.8 | 0.87 | 1.52 | 2.85 | 6.7 |
| 20 | 700 | 535 | 180 | 53 | 65481 | 208 | 45.9 | 96.5 | 0.61 | 1.06 | 0.75 | 3.4 |
| 21 | 700 | 550 | 188 | 43 | 65486 | 198 | 2.2 | 61.6 | 0.87 | 0.89 | 2.35 | 6.1 |
| 23 | 715 | 535 | 188 | 48 | 65491 | 198 | 18.3 | 92.4 | 0.79 | 0.88 | 2.85 | 5.7 |
| 24 | 715 | 550 | 172 | 53 | 65481 | 203 | 55.2 | 28.6 | 0.69 | 1.42 | 0.15 | 7.0 |
| 25 | 715 | 565 | 180 | 43 | 65486 | 208 | 75.0 | 13.7 | 0.73 | 0.50 | 1.15 | 1.5 |
| 26 | 700 | 550 | 180 | 48 | 65486 | 203 | 30.9 | 64.2 | 0.67 | 0.14 | 2.45 | 2.7 |
| 27 | 715 | 550 | 180 | 48 | 65486 | 203 | 7.1 | 45.7 | 0.46 | 0.51 | 1.35 | 3.9 |
| 28 | 700 | 565 | 180 | 48 | 65486 | 203 | 25.9 | 4.0 | 0.23 | 0.90 | 1.55 | 2.1 |
| 29 | 700 | 550 | 188 | 48 | 65486 | 203 | 42.2 | 56.9 | 0.49 | 0.53 | 1.15 | 1.1 |

PRE-CORRECTION

| 10 | 685 | 565 | 188 | 53 | 65491 | 208 | 89.4 | 34.2 | 0.26 | 2.36 | 2.55 | 12.4 |

POST-CORRECTION

| 10 | 699 | 553 | 176 | 47 | 65488 | 206 | 89.4 | 34.2 | 0.26 | 1.10 | 0.78 | 0.0 |

*The threshold is 0.5 for the color difference, and also 2 for the gloss difference.

*Bold numbers indicate that their respective thresholds are not exceeded.

Effects

As described above, in the case of the color correcting system 5, or the image forming apparatus 1 including the same, if one or more of the values for gloss, line width and line position for an image, in addition to the value for color, are determined to not exceed their respective thresholds, acquired information (control parameters and status parameters) are added to unit space data. Even if the values for gloss, line width, and line position vary among images, as specifically described with reference to Table 5, the images can be corrected to the reference color, as shown in FIG. 7C, by performing color correction on the basis of the unit space data.

Supplementary

Note that in the foregoing, the gloss, the line width, and the line position, in addition to the color, are used as determination bases, and in order to acquire detection values for them, the sensors SE7 to SE10 are used. However, this is not restrictive, and the amount of adhering toner, the line width, and the line position, in addition to the color, may be used as determination bases. In this case, the detection value for the color is acquired from the sensor SE10. Moreover, the detection values for the amount of adhering toner, the line width, and the line position are acquired from the sensors SE1, SE2, and SE3.

Although the present invention has been described in connection with the preferred embodiment above, it is to be noted that various changes and modifications are possible to those who are skilled in the art. Such changes and modifications are to be understood as being within the scope of the invention.

What is claimed is:

1. A color correcting system mountable in an image forming apparatus, comprising:
   an imaging unit configured to perform image formation; and
   a controller configured to:
   acquire a control parameter for use in image formation by the imaging unit and a status parameter indicating a status at the time of image formation;
   determine a control parameter on the basis of the acquired control parameter and the acquired status parameter, such that at least a color difference relative to a reference color being set decreases, if a value for a color in an image formed by the imaging unit does not exceed a first threshold, and at least one non-color value selected from the group consisting of adhering toner amount, gloss, line width, and line position for the image formed by the imaging unit does not exceed a second threshold; and
   add to unit space data the acquired control parameter and the acquired status parameter that corresponds to a color not exceeding the thresholds determined relative to the reference color being set.

2. The color correcting system according to claim 1, further comprising:
   a first sensor configured to detect the value for the color in an image formed by the imaging unit; and
   at least one second sensor configured to detect at least one non-color value selected from the group consisting of toner adhering amount, gloss, line width, and line position for the image formed by the imaging unit.

3. The color correcting system according to claim 1, wherein the controller is configured to determine whether or not the value for the color detected by the first sensor exceeds the first threshold, and is configured to thereafter determine whether or not the at least one non-color value detected by the second sensor exceeds the second threshold.

4. The color correcting system according to claim 1, wherein, after the determination of the control parameter, if the value for the color detected by the first sensor does not exceed the first threshold, and the at least one non-color value detected by the second sensor does not exceed the second threshold, the controller is configured to add the acquired control parameter and the acquired status parameter to unit space data.

5. The color correcting system according to claim 1, wherein the reference color irrelevant to a color in the image formed by the image forming apparatus is set for the controller.

6. The color correcting system according to claim 1, wherein the reference color set for the controller is uniquely shared among a plurality of image forming apparatuses of the same model, and the controller is configured to add to unit space data any control parameter or status parameter that corresponds to a color not exceeding a threshold determined relative to the reference color being set.

7. The color correcting system according to claim 1, wherein the controller is configured to have a plurality of unit space data sets, and is configured to determine the control parameter on the basis of one unit space data set selected by the operator.

8. The color correcting system according to claim 4, wherein the unit space data includes control parameters and status parameters within a predetermined time period.

9. An image forming apparatus comprising a color correcting system of claim 1 mounted therein.

* * * * *